Patented Oct. 12, 1943

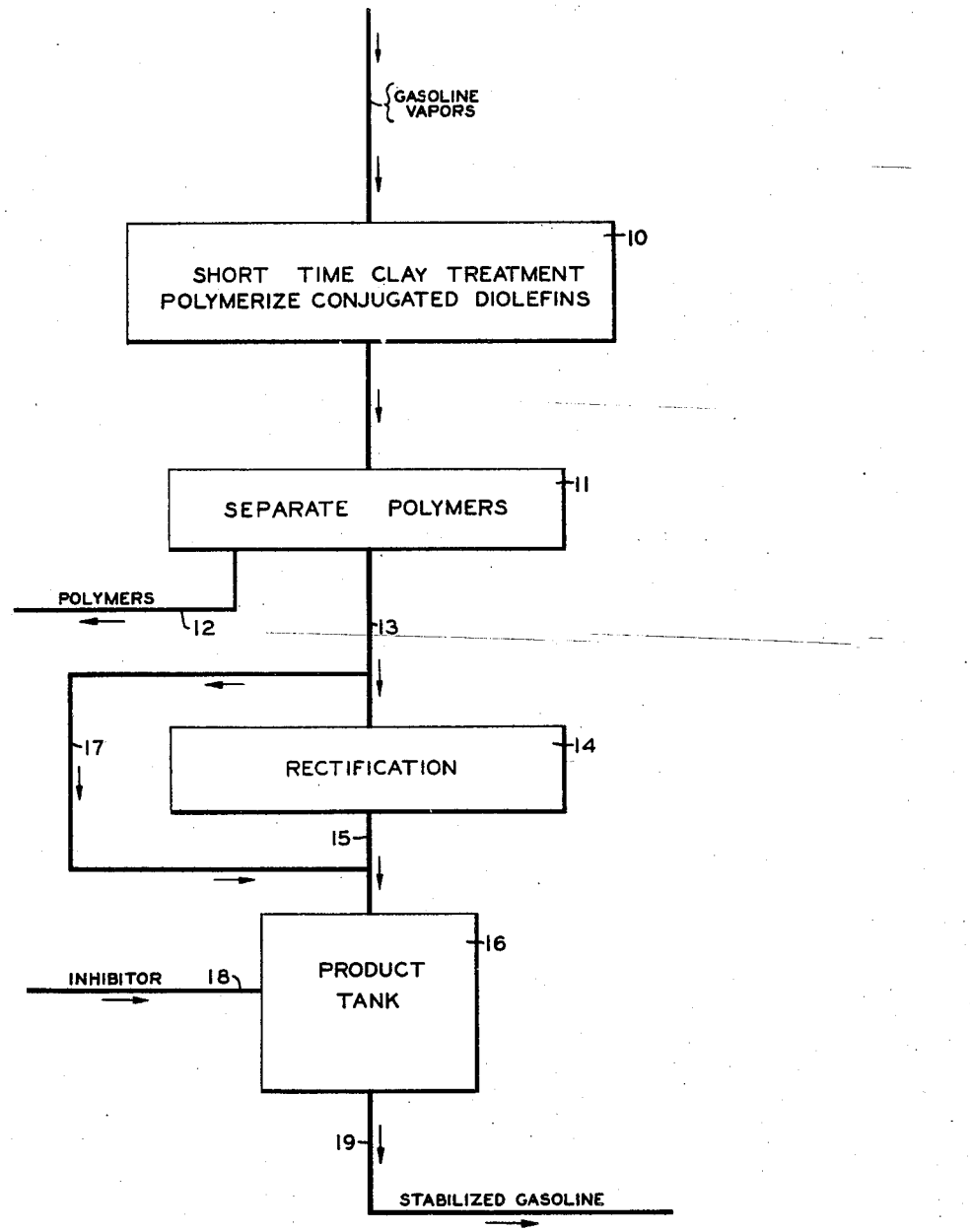

2,331,438

UNITED STATES PATENT OFFICE 2,331,438

REFINING OF HYDROCARBONS

William M. Stratford, New York, N. Y., assignor, by mesne assignments, to The Texas Company, New York, N. Y., a corporation of Delaware Application September 30, 1941, Serial No. 412,959

2 Claims. (Cl. 196—96)

This invention relates to certain improvements in the treatment of hydrocarbons for the purpose of effecting the chemical stabilization thereof and has particular reference to the treatment of the lighter hydrocarbons such as gasoline or motor fuel for the purpose of producing products of a stable nature.

Certain hydrocarbon products, especially products produced by the cracking of hydrocarbons, contain varying amounts of unstable unsaturated hydrocarbons such as the diolefins which are readily susceptible, during storage, transportation and use to oxidation producing gummy substances. Such products have been treated for the purpose of stabilizing them and to produce products resistant to autoxidation by contacting them with solid adsorptive catalytic material, such as fuller's earth and the like, under conditions adapted to effect polymerization of the unstable hydrocarbons which tend to form gummy substances. In the practice of this process the hydrocarbons are treated to such an extent that the treated product will meet the usual tests for stability such as the oxygen bomb test for determining the induction period and the copper dish gum test.

In accordance with my invention the hydrocarbons containing unstable unsaturated hydrocarbons are subjected to a treatment with a solid adsorbent catalyst such as fuller's earth and the like under limiting conditions so as to effect polymerization of only the more highly reactive of the unstable unsaturated hydrocarbons and the product thus partially stabilized is treated with an inhibitor or antioxidant to produce a stabilized product. In the practice of the invention it is not necessary to treat the hydrocarbons with the adsorptive catalytic material to such an extent that the treated product will be stable as determined by the induction period and copper dish gum tests. By limiting the time of contact of the hydrocarbons with the adsorptive catalyst so that only the more reactive of the unstable unsaturated hydrocarbons, such as the conjugated diolefins, are polymerized and then treating the partially stabilized product with an inhibitor or antioxidant a product is produced which will exhibit marked stability characteristics in storage, transportation and use.

An important advantage of the invention resides in materially reducing conversion of gasoline or motor fuel to products boiling outside the gasoline range. When the gasoline is given sufficient treatment with the solid adsorbent catalytic material to produce a stable product as determined by the induction period test and the copper dish gum test the average conversion to polymers will approximate 2%–3% of the liquid volume of gasoline treated, these figures being arrived at by taking as polymers the proportion of constituents formed which are higher boiling than the hydrocarbons subjected to treatment. In many cases when treating gasoline stocks containing large proportions of unstable unsaturated compounds the formation of polymers is even higher, approximating 4% or 5%. In accordance with the invention the time of contact with the adsorptive catalyst is so limited that only the very highly reactive unstable hydrocarbons, such as the conjugated diolefins, are polymerized and the yield of polymers will not exceed about 1% of the liquid volume of the hydrocarbons treated and, in fact, in many cases will approximate 0.25%–0.5% of such liquid volume, with the result that by means of the invention there is an actual increase in yield of gasoline of the order of at least 1% and frequently even greater yields are produced. Moreover, the invention has other advantages, such as the reduction in the amount of catalyst employed (the invention employs less than half and usually about one-third of the amount of catalyst required by the prior art practice) thus reducing the size of contact chambers required and effecting material savings in investment cost.

Inhibitors or suppressors are not of the greatest effectiveness on the more reactive gum forming constituents and may be employed with greater advantage where only the less reactive gum-forming constituents remain in the hydrocarbons. Thus, inhibitors may be added to totally unrefined cracked gasoline in sufficient quantity that the gasoline will meet the induction period and copper dish gum tests and yet the treated product may be unstable in storage with pronounced tendencies toward gum formation. But when in accordance with the invention the gasoline is subjected to treatment with a solid adsorptive catalytic material under conditions to effect polymerization of only the more reactive gum forming constituents and an inhibitor or antioxidant is added to the treated product the inhibitor or antioxidant will satisfactorily function to inhibit or suppress oxidation and gum formation, and the final product will exhibit superior qualities of stability.

In practicing the invention the hydrocarbons are contacted with a solid adsorptive catalyst, preferably an adsorptive material of the clay type such as fuller's earth, with a time of contact of the order of 10–50 seconds. By so limiting the time of reaction during the treatment only the more reactive of the unstable unsaturated hydrocarbons will be polymerized with the result that certain of the less reactive of the unstable unsaturated hydrocarbons will remain in the treated hydrocarbons. The hydrocarbons thus partially stabilized are then treated with an inhibitor or antioxidant to produce a product which is highly stable in storage, transportation and use.

The following is an analysis by vacuum distillation of a typical polymer product produced by treating cracked gasoline with fuller's earth under polymerizing conditions so as to produce a stable gasoline which will be stable as determined by the induction period and copper dish gum tests:

| Cut | Specific gravity at 80° F. | Iodine number (method of Hanus) | Viscosity Saybolt Universal at 100° F. |
| --- | --- | --- | --- |
|  |  |  | Seconds |
| 1 | .7800 | 64 | ---------- |
| 2 | .7880 | 75 | ---------- |
| 3 | .7932 | 81 | ---------- |
| 4 | .8040 | 91 | ---------- |
| 5 | .8202 | 102 | 35 |
| 6 | .8460 | 122 | 38 |
| 7 | .8931 | 162 | 47½ |
| 8 | .9588 | 186 | 281 |
| 9 | .9763 | 267 | 2,760 |
| Residue | 1.06 | 170 | ---------- |

All of the distillate products obtained in this analysis are liquid products and the residue is a tarry material having a melting point of 248° F.

From the above table it will be seen, with respect to the distilled fractions of the polymer, that as the specific gravity increases the iodine number increases and that the heavier fractions have very much higher iodine numbers than the lighter fractions. In accordance with my invention the time of reaction in which the gasoline is contacted with the adsorbent clay is limited so that only the more highly reactive of the unstable unsaturated hydrocarbons are polymerized. In other words, the time of reaction is limited so that only those diolefins which form the higher molecular weight polymers or which form polymerized products having the higher iodine numbers and viscosities are removed from the gasoline. The less reactive diolefins, which upon polymerization form lower molecular weight polymers of lower iodine numbers and lower viscosities, may remain in the gasoline since, with the hydrocarbons capable of polymerization to form the higher molecular weight polymers of higher iodine numbers and viscosities removed from the gasoline, the gasoline may be made stable by treatment with an inhibitor or antioxidant.

In practicing the invention the partially stabilized gasoline may be treated with any of the usual gum inhibitors or antioxidants such as the naphthols, for example alpha naphthol, and the aminophenols such as iso and normal butyl para-aminophenol.

The accompanying drawing is a flow diagram illustrating the invention.

Referring to the drawing, gasoline or other light hydrocarbons in vapor form are charged to a treating zone 10 wherein the vapors are contacted with solid adsorptive catalytic material such as fuller's earth under conditions to effect polymerization of only the more reactive gum-forming constituents. The time of contact of the vapors with the catalytic material is so limited that the polymerization is essentially limited to polymerization of the conjugated diolefins. The resultant polymers are separated at 11 from the treated gasoline. The polymers are withdrawn through a line 12. Due to the limited time of treatment to which the gasoline has been subjected in the contacting zone 10, the treated gasoline will not ordinarily pass the copper dish gum test and the oxygen bomb test at this stage. If the gasoline contains lighter hydrocarbons than are desired in the final product the gasoline may be directed through a line 13 to a stabilizing or rectifying zone 14 wherein the gasoline is subjected to rectification to produce a product of desired vapor pressure. The rectified product is passed through a line 15 to a blending tank 16. In case the treated gasoline which is withdrawn from the polymer separating zone 11 does not require rectification it may be directed through a by-pass line 17 to the blending tank 16. The inhibitor is introduced through a line 18 and blended with the gasoline in the tank 16. The stabilized gasoline product is withdrawn through a line 19.

The invention is advantageously carried out by passing gasoline-containing vapors from the fractionator of a cracking still or evaporator or rerun still directly to a chamber containing a bed of adsorbent clay catalyst maintained at active polymerizing temperatures which will usually be of the order of 300° F.–500° F. and under appropriate conditions of vapor saturation and refluxing. The operation is advantageously conducted at superatmospheric pressures of the order of 100–400 lbs. The rate of the flow of vapors through the clay is regulated so that the time of contact with the clay will be within a range of 10–50 seconds assuming 50% voids in the clay or with the time so limited that the quantity of polymer produced during the clay treating cycle will be 0.25%–1.0% of the liquid volume of the gasoline treated. Satisfactory results may be obtained by limiting the production of polymer to about 0.25%–0.5% of the liquid volume of the gasoline treated. The polymers are separated from the gasoline and the gasoline is subjected to rectification or stabilization if desired to produce a product of desired vapor pressure. The gasoline is then blended with a relatively small amount of the gum inhibitor so as to produce a stable product as determined by the induction period and copper dish gum tests.

The copper dish gum test and the oxygen bomb test for determining the induction period are tests well known in the industry. For a description of the copper dish gum test reference is made to Federal Standard Stock Catalog VV–L–791a (1934) sec. IV (part 5) Federal Specification for Lubricants and Liquid Fuels; General Specifications (methods for sampling and testing) F–6CC Method 330.1 Gum Content of Gasoline by the Copper Dish Method; and U. O. P. Laboratory Test Methods for Petroleum and Its Products; Copper Dish Gum Content of Gasoline U. O. P. Method H–11–40 and for a description of the induction period test reference is made to A. S. T. M. Standards 1939, part III, page 611; Tentative Method of Test for Gum Stability of Gasoline and U. O. P. Laboratory Test Methods for Petroleum and Its Products, Induction Period of Gasoline by the Oxygen Bomb, Method No. H–6–40. A high induction period of about 240–300 minutes or higher together with low copper dish gum, not over about 15–25 milligrams, is considered indicative of the stability of the gasoline.

In one method of practicing the invention cracked gasoline vapors of 420° F. end point are taken off a fractionator of a cracking system and continuously passed through a bed of fuller's earth at a temperature of about 450° F. under 200 lbs. pressure with the rate of flow of vapors being maintained throughout the treatment so that the time of contact assuming 50% voids in the clay is 20 seconds. The products are fractionated to obtain a 400° F. end point gasoline. The products boiling above 420° F. amount to about 0.25% of the liquid volume of the vapors treated. Normal butyl para-aminophenol is added to the treated gasoline product in the amount of about 2 lbs. per 1000 barrels.

While I have described a particular embodiment of my invention for purposes of illustration, it should be understood that various modifications and adaptations thereof which will be obvious to one skilled in the art, may be made within the spirit of the invention as set forth in the appended claims.

I claim:

1. The method of refining light hydrocarbons, such as gasoline, containing unstable, unsaturated hydrocarbons comprising potential gum-forming constituents of the nature of diolefins that comprises subjecting the hydrocarbons to a polymerizing treatment in contact with a solid adsorptive catalyst at a temperature of the order of 300° F.–500° F. under a time of contact of the order of 10–50 seconds to effect selective polymerization of conjugated diolefins so that the treated product contains unpolymerized diolefins and is unstable as indicated by the copper dish gum and oxygen bomb tests, separating the polymer product from the treated hydrocarbons and adding a gum inhibitor to the treated hydrocarbons to produce a product capable of meeting the copper dish gum and oxygen bomb tests and which is characterized by stability in storage.

2. The method of refining light hydrocarbons, such as gasoline, containing unstable, unsaturated hydrocarbons comprising potential gum-forming constituents of the nature of diolefins that comprises subjecting the hydrocarbons to a polymerizing treatment in contact with a solid adsorptive catalyst at a temperature of the order of 300° F.–500° F. under a time of contact of the order of 10–50 seconds and with the quantity of higher boiling polymer produced being limited to that of the order of 0.25%–0.5% of the liquid volume of hydrocarbons treated so that the polymerization is restricted essentially to the polymerization of the conjugated diolefins, separating the polymer product from the treated hydrocarbons and adding a gum inhibitor to the treated hydrocarbons to produce a stabilized product.

WILLIAM M. STRATFORD.